(12) United States Patent
Pitman

(10) Patent No.: US 11,613,377 B2
(45) Date of Patent: Mar. 28, 2023

(54) METHODS AND SYSTEMS FOR IN-FLIGHT FUELLING OF AIRCRAFT

(71) Applicant: James Pitman, London (GB)

(72) Inventor: James Pitman, London (GB)

( * ) Notice: Subject to any disclaimer, the term of this patent is extended or adjusted under 35 U.S.C. 154(b) by 40 days.

(21) Appl. No.: 16/754,894

(22) PCT Filed: Jun. 6, 2019

(86) PCT No.: PCT/GB2019/051575
§ 371 (c)(1),
(2) Date: Apr. 9, 2020

(87) PCT Pub. No.: WO2020/065247
PCT Pub. Date: Apr. 2, 2020

(65) Prior Publication Data
US 2021/0197981 A1 Jul. 1, 2021

(30) Foreign Application Priority Data
Sep. 27, 2018 (GB) ..................... 1815772

(51) Int. Cl.
*B64D 39/02* (2006.01)
*B64D 39/06* (2006.01)
(Continued)

(52) U.S. Cl.
CPC ............. *B64D 39/02* (2013.01); *B64D 39/00* (2013.01); *B64D 39/06* (2013.01);
(Continued)

(58) Field of Classification Search
CPC ........ B64D 39/00; B64D 39/02; B64D 39/06; B64D 37/14; B64C 31/06; B64C 2201/063; B64C 39/024
See application file for complete search history.

(56) References Cited

U.S. PATENT DOCUMENTS 1,806,833 A * 5/1931 Ullendorff ............. B64D 39/00
244/135 A
1,806,834 A 5/1931 Ullendorff
(Continued)

FOREIGN PATENT DOCUMENTS

EP 0472927 A1 * 3/1992 ........... B64C 39/024
EP 0472927 A1 3/1992
(Continued)

OTHER PUBLICATIONS

Naval Warfare Publication: Underway Replenishment NWP 4-01.4, Department of the Navy (Year: 1996).*
(Continued)

*Primary Examiner* — Joshua J Michener
*Assistant Examiner* — Ryan Andrew Yankey
(74) *Attorney, Agent, or Firm* — Tarolli, Sundheim, Covell & Tummino LLP

(57) ABSTRACT

A method of operating a fuel tanker aircraft for in-flight fuelling comprises: transmitting a deploy command signal from a communication unit of the tanker aircraft to a communication unit of a fuel receiver aircraft, to cause a line and drogue to deploy from the receiver aircraft; controlling at least one of the tanker aircraft and the drogue to engage the drogue with a first end of a fuel hose of the tanker aircraft, a second end of the fuel hose being connected to the tanker aircraft; and transmitting a return command signal from the communication unit of the tanker aircraft to the communication unit of the receiver aircraft, to cause the line and drogue to return to the receiver aircraft with the first end of the fuel hose.

19 Claims, 9 Drawing Sheets

(51) Int. Cl.
  *H02J 50/10* (2016.01)
  *H02J 7/00* (2006.01)
  *B64D 39/00* (2006.01)

(52) U.S. Cl.
  CPC ........ *H02J 7/00032* (2020.01); *H02J 7/0045* (2013.01); *H02J 50/10* (2016.02)

(56) References Cited

U.S. PATENT DOCUMENTS

| | | | |
|---|---|---|---|
| 2,023,310 A * | 12/1935 | Alan | B64D 39/00 244/135 A |
| 2,123,648 A * | 7/1938 | Alan | B64D 39/00 244/135 A |
| 2,193,312 A * | 3/1940 | Alan | B64D 39/00 244/135 A |
| 2,261,598 A | 11/1941 | Tyson | |
| 2,769,604 A * | 11/1956 | Hudson | B64D 39/04 244/135 A |
| 4,126,162 A | 11/1978 | Clark et al. | |
| 4,905,937 A | 3/1990 | Spotswood et al. | |
| 5,131,438 A | 7/1992 | Loucks | |
| 5,141,178 A | 8/1992 | Alden et al. | |
| 6,604,711 B1 | 8/2003 | Stevens et al. | |
| 7,568,660 B2 | 8/2009 | Howe | |
| 2002/0074455 A1 | 6/2002 | Ollar | |
| 2004/0065383 A1 | 4/2004 | Jones et al. | |
| 2007/0181748 A1 | 8/2007 | Mouskis | |
| 2009/0184205 A1 * | 7/2009 | Matheny | B64D 39/00 244/135 A |
| 2010/0276537 A1 * | 11/2010 | Kutzmann | B64D 5/00 244/1 TD |
| 2013/0000927 A1 | 1/2013 | Meier et al. | |
| 2015/0336677 A1 | 11/2015 | Smaoui | |
| 2016/0031564 A1 | 2/2016 | Yates | |
| 2016/0195447 A1 | 7/2016 | Nance | |
| 2017/0275016 A1 | 9/2017 | Guerquin | |
| 2019/0315479 A1 * | 10/2019 | Tillotson | G06T 7/73 |
| 2021/0362871 A1 * | 11/2021 | Pitman | B64D 39/02 |

FOREIGN PATENT DOCUMENTS

| | | | |
|---|---|---|---|
| EP | 3680178 A1 * | 7/2020 | |
| GB | 462818 A | 3/1937 | |
| GB | 2373488 A * | 9/2002 | ........ B64C 39/024 |
| WO | WO-2008045116 A2 * | 4/2008 | ........ B64D 39/04 |
| WO | 2020065247 A1 | 4/2020 | |
| WO | 2020065271 A1 | 4/2020 | |
| WO | 2020065322 A1 | 4/2020 | |

OTHER PUBLICATIONS

International Search Report and Written Opinion dated Sep. 20, 2019 for corresponding International Application No. PCT/GB2019/051575.

"Unit Load Devices," Dec. 25, 2017, Qantas (Year: 2017).

* cited by examiner

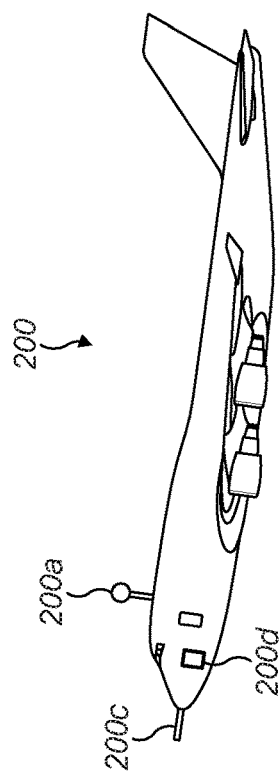
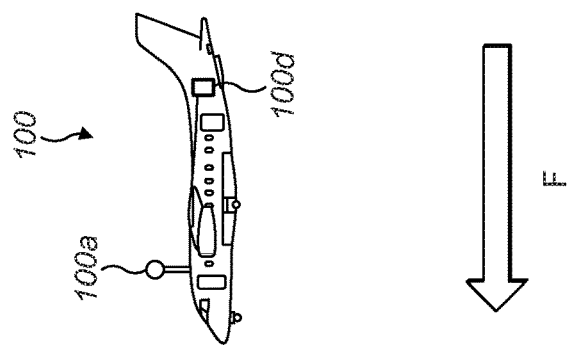
FIG. 1

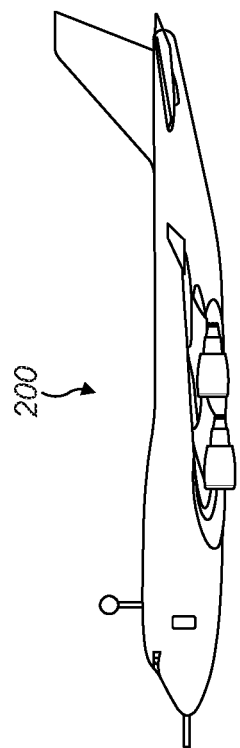
FIG. 2
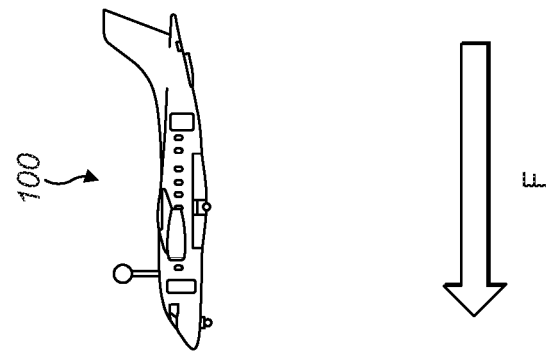

METHODS AND SYSTEMS FOR IN-FLIGHT FUELLING OF AIRCRAFT

RELATED APPLICATIONS

The present application is a U.S. National Stage application under 35 USC 371 of PCT Application Serial No. PCT/GB2019/051575, filed on 6 Jun. 2019; which claims priority from GB Patent Application No. 1815772.7, filed 27 Sep. 2018, the entirety of both of which are incorporated herein by reference.

BACKGROUND OF THE INVENTION

The present invention relates to methods and systems for in-flight (re)fuelling of aircraft.

In-flight refuelling (IFR) involves the transfer of fuel (typically a liquid fuel, e,g, kerosene) from one aircraft (the "tanker") to another aircraft (the "receiver") during flight. IFR (also known as aerial refuelling or air-to-air refuelling) has become a well-established methodology used to extend the range or loiter time (or increase take-off payload) of military aircraft. Typically the tanker is based on an airliner which has been specially redesigned or converted for refuelling operations, while the receiver is usually a fighter aircraft, or possibly a bomber or reconnaissance aircraft.

Experimentation with IFR began in the 1920s and continued through the 1930s. Early systems used a grappling method, whereby the crew of a tanker aircraft would unreel a fuel hose from the tanker and the crew of a receiver aircraft would grapple the hose in the air, reel it in and attach it to the receiver's fuel tank. In a variation on this method a cable was thrown from a receiver aircraft and was grappled in the air by the crew of a tanker aircraft. The tanker crew drew the free end of the cable back into the tanker and attached it to a fuel hose. The receiver crew then pulled the cable (and the hose attached thereto) back to the receiver in order to connect the hose to the receiver's fuel tank. With the hose connected, the tanker ascended above the receiver in order to supply the fuel under gravity.

By the 1950s IFR had become well-established for military aircraft and today there are two different methods in widespread use: flying boom and probe-and-drogue.

The flying boom is attached at the rear of the tanker and comprises a rigid, telescopic and articulated tube having a nozzle at one end. The boom includes flight control surfaces which can be moved to create aerodynamic forces for controlling the boom in flight. For refuelling the receiver is firstly positioned in formation behind the tanker, which flies straight and level. A boom operator on-board the tanker then extends the boom and adjusts the flight control surfaces so that the nozzle is guided into a receptacle on the following receiver. Once the nozzle is securely inserted and locked in the receptacle, fuel is pumped from the tanker to the receiver. When the desired amount of fuel has been transferred, the nozzle is disconnected from the receptacle by the boom operator and the two aircraft are then free to break formation.

In the probe-and-drogue system the tanker aircraft is equipped with a flexible hose. The drogue (or basket), which resembles a shuttlecock, is attached to an end of the hose. The other end is attached to a hose drum unit (HDU), the hose being reeled on the HDU when not in use. The probe is a rigid, tubular arm which extends from the nose or fuselage of the receiver aircraft. The probe is typically retractable so that it can be stored away when not in used.

For refuelling the hose and drogue are trailed out behind and below the tanker while the tanker flies straight and level. The hose is stabilized in flight by the shuttlecock form of the drogue. The pilot of the receiver positions the receiver behind and below the tanker. The pilot then flies the receiver aircraft toward the tanker so that the extended probe is inserted into the funnel-shaped drogue. When the probe is properly engaged with the drogue, fuel is pumped from the tanker to the receiver. A motor in the HDU controls the hose to be retracted and extended as the receiver aircraft moves fore and aft, thereby maintaining the correct amount of tension to prevent undesirable bending of the hose. When the desired amount of fuel has been transferred, the probe is disconnected from the drogue and the two aircraft can break formation.

Unlike the flying boom system, the probe-and-drogue system has no need for a dedicated boom operator on-board the tanker aircraft. Also the tanker design is simpler. Furthermore the tanker can be provided with multiple hoses and drogues so that two or more receiver aircraft can be fuelled simultaneously, whereas the flying boom system can fuel only one receiver aircraft at a time. On the other hand, the fuel flow rate of the probe-and-drogue system is lower than that of the flying boom system, meaning longer fuelling times. In addition the probe-and-drogue system is more susceptible to adverse weather conditions and turbulence. Furthermore the probe-and-drogue system requires all receiver aircraft to be fitted with a re-fuelling probe.

While IFR has become routine for military aircraft, it has not been applied to any significant extent in commercial aircraft operations, despite huge potential benefits in terms of cost-savings due to reduced fuel consumption. The main reason is the high level of skill needed by the pilot of the receiver aircraft to safely control the receiver during the hazardous fuelling operation. This requires specialized and regular training which is not practical for commercial airline crews.

Furthermore some elements of the IFR systems themselves seem unsuitable for use with airliners as receiver aircraft. For example, the kind of boom used in the flying boom system of a military aircraft would be too short to provide safe separation between the tanker and the receiver when the receiver is a large airliner.

For these reasons at least it seems the kinds of IFR systems used by military operators are unsuitable for use with large civil aircraft, and would be unlikely to receive safety certification for commercial airline operations.

The present invention therefore seeks to provide methods and systems for in-flight (re)fuelling of civil aircraft.

SUMMARY OF THE INVENTION

According to an aspect of the invention, there is provided a method of operating a fuel tanker aircraft for in-flight fuelling, comprising: transmitting a deploy command signal from a communication unit of the tanker aircraft to a communication unit of a fuel receiver aircraft, to cause a line and drogue to deploy from the receiver aircraft; controlling at least one of the tanker aircraft and the drogue to engage the drogue with a first end of a fuel hose of the tanker aircraft, a second end of the fuel hose being connected to the tanker aircraft; and transmitting a return command signal from the communication unit of the tanker aircraft to the communication unit of the receiver aircraft, to cause the line and drogue to return to the receiver aircraft with the first end of the fuel hose, wherein the tanker aircraft is located behind the receiver aircraft and the deploy command signal is for causing the line and drogue to deploy rearwardly of the receiver aircraft.

The method of operating a fuel tanker aircraft may further comprise activating a fuel pump of the tanker aircraft to transfer fuel from the tanker aircraft to the receiver aircraft via the fuel hose.

The method of operating a fuel tanker aircraft may further comprise transmitting a further return command signal from the communication unit of the tanker aircraft to the communication unit of the fuel receiver aircraft, to cause the line and drogue and first end of the fuel hose to return to the tanker aircraft.

The method of operating a fuel tanker aircraft may further comprise causing the drogue to disengage from the first end of the fuel hose; and transmitting a further return command signal from the communication unit of the tanker aircraft to the communication unit of the receiver aircraft, to cause the line and drogue to return to the receiver aircraft.

Controlling the tanker aircraft to engage the drogue with the first end of the fuel hose may comprise manoeuvring the tanker aircraft to guide the first end of the fuel hose into the drogue.

Controlling the drogue to engage the drogue with the first end of the fuel hose may comprise sending control signals from the communication unit of the tanker aircraft to cause adjustment of aerodynamic control surfaces of the drogue to guide the drogue onto the first end of the fuel hose.

According to another aspect of the invention, there is provided a method of operating a fuel receiver aircraft for in-flight fuelling, comprising: acquiring in a communication unit of the receiver aircraft a deploy command signal from a communication unit of a fuel tanker aircraft; in response to the deploy command signal, controlling a line and drogue to deploy from the receiver aircraft to enable the drogue to be engaged with a first end of a fuel hose of the tanker aircraft, a second end of the fuel hose being connected to the tanker aircraft; acquiring in the communication unit of the receiver aircraft a return command signal from the communication unit of the tanker aircraft; and in response to the return command signal, controlling the line and drogue to return to the receiver aircraft with the first end of the fuel hose, wherein the tanker aircraft is located behind the receiver aircraft and the line and drogue are controlled to deploy rearwardly of the receiver aircraft.

According to another aspect of the invention, there is provided a method of operating aircraft for in-flight fuelling, comprising: transmitting a deploy command signal from a communication unit of a fuel tanker aircraft; acquiring the deploy command signal in a communication unit of a fuel receiver aircraft; in response to the deploy command signal, controlling a line and drogue to deploy from the receiver aircraft; controlling at least one of the tanker aircraft and the drogue to engage the drogue with a first end of a fuel hose of the tanker aircraft, a second end of the fuel hose being connected to the tanker aircraft; transmitting a return command signal from the communication unit of the tanker aircraft; acquiring the return command signal in the communication unit of the receiver aircraft; and in response to the return command signal, controlling the line and drogue to return to the receiver aircraft with the first end of the fuel hose, wherein the tanker aircraft is located behind the receiver aircraft and the line and drogue are controlled to deploy rearwardly of the receiver aircraft.

According to another aspect of the invention, there is provided a system for a fuel tanker aircraft for in-flight fuelling, comprising: a fuel hose comprising a first end for engagement with a drogue of a fuel receiver aircraft and a second end connected to the fuel tanker aircraft; and a communication unit configured to transmit command signals to a communication unit of the receiver aircraft, wherein the command signals comprise: a deploy command signal, for causing the receiver aircraft to deploy a line and drogue rearwardly to the tanker aircraft behind the receiver aircraft to enable the drogue to be engaged with the first end of the fuel hose; and a return command signal, for causing the line and drogue to return to the receiver aircraft with the first end of the fuel hose.

The first end of the fuel hose may comprise a fuel probe configured to be removably attached to the fuel tanker aircraft.

According to another aspect of the invention, there is provided a system for a fuel receiver aircraft for in-flight fuelling, comprising: a line and drogue for engagement with a first end of a fuel hose of a fuel tanker aircraft, a second end of the fuel hose being connected to the tanker aircraft; a communication unit configured to acquire deploy and return command signals from a communication unit of the tanker aircraft; and a controller configured to: in response to the deploy command signal, deploy the line and drogue rearwardly to the tanker aircraft behind the receiver aircraft to enable the drogue to be engaged with the first end of the fuel hose; and in response to the return command signal, return the line and drogue to the receiver aircraft with the first end of the fuel hose.

The drogue may comprise adjustable aerodynamic control surfaces for guiding the drogue for engagement with the first end of the fuel hose in flight.

The drogue may further comprise a communication unit for receiving control signals from the communication unit of the tanker aircraft for adjusting the aerodynamic control surfaces. The control signals from the communication unit of the tanker aircraft may be received directly by the communication unit of the drogue, or indirectly via the communication unit of the receiver aircraft and the line to the drogue.

The drogue may further comprise a dedicated electrical power source for powering the adjustable aerodynamic control surfaces. The power source may comprise, for example, an air-driven generator, or a battery, optionally a rechargeable battery.

The line may comprise a conductive material for transmitting electrical power from the receiver aircraft to the drogue for powering the adjustable aerodynamic control surfaces.

According to another aspect of the invention, there is provided a system for in-flight fuelling, comprising: a fuel receiver aircraft comprising: a line and drogue; a communication unit configured to acquire deploy and return command signals for the line and drogue; and a controller for controlling the line and drogue in response to the command signals; and a fuel tanker aircraft comprising: a fuel hose comprising a first end for engagement with the drogue and a second end connected to the fuel tanker aircraft; and a communication unit configured to transmit the command signals, wherein: the controller is configured, in response to the deploy command signal, to deploy the line and drogue rearwardly to the tanker aircraft behind the receiver aircraft; at least one of the tanker aircraft and the drogue is controllable to engage the drogue with the first end of the fuel hose; and the controller is configured, in response to the return command signal, to return the line and drogue to the receiver aircraft with the first end of the fuel hose.

The drogue may comprise adjustable aerodynamic control surfaces for guiding the drogue for engagement with the first end of the fuel hose in flight.

The drogue may further comprise a communication unit for receiving control signals from the communication unit of the tanker aircraft for adjusting the aerodynamic control surfaces.

The drogue may further comprise a dedicated electrical power source for powering the adjustable aerodynamic control surfaces.

The line may comprise a conductive material for transmitting electrical power from the receiver aircraft to the drogue for powering the adjustable aerodynamic control surfaces.

The tanker aircraft is behind or astern the receiver aircraft during fuelling operations. This avoids the risk of wake turbulence (i.e. generated by the tanker aircraft) for the receiver aircraft and its passengers. The tanker aircraft may be directly behind the receiver aircraft, i.e. such there is a longitudinal separation between the nose of the tanker aircraft and the tail of the receiver aircraft but no lateral separation between the noses of the two aircraft. Or the tanker aircraft may be behind and offset from the receiver aircraft, i.e. such that there is a longitudinal separation between the nose of the tanker aircraft and the tail of the receiver aircraft and also a lateral separation between the noses of the two aircraft.

The tanker aircraft may be located below the receiver aircraft such that there is a height separation between the tanker aircraft and the receiver aircraft, i.e. the tanker aircraft is at a lower altitude than the receiver aircraft. Or the tanker aircraft may be located at the same altitude as the receiver aircraft, i.e. such that there is no height separation between the tanker aircraft and the receiver aircraft. Or the tanker aircraft may be located above the receiver aircraft such that there is a height separation between the tanker aircraft and the receiver aircraft, i.e. the tanker aircraft is at a higher altitude than the receiver aircraft.

The height of the tanker aircraft relative to the receiver aircraft may be changed while fuel is being transferred from the tanker aircraft to the receiver aircraft. For example the tanker aircraft may initially be at a lower altitude than the receiver aircraft but may move to be at the same altitude or a higher altitude than the receiver aircraft. Or the tanker aircraft may initially be at the same altitude as the receiver aircraft but may move to be at a higher or lower altitude than the receiver aircraft. Or the tanker aircraft may initially be at a higher altitude than the receiver aircraft but may move to be at the same altitude or a lower altitude than the receiver aircraft.

The invention offers numerous benefits, as follows.

The deployment of the line and drogue from the receiver aircraft, engagement of the fuel hose with the drogue, and attachment of the fuel hose to the receiver aircraft, are all controlled by the crew of the tanker aircraft who possess the specialist skills needed for these operations. There is therefore no requirement for the commercial crew of the receiver aircraft to be specially trained, either in terms of flying in formation or in handling the fuelling system.

Furthermore the fuel hose and associated components, which are the parts of the system that are likely to be subject to the most stringent certification requirements, are comprised by the tanker aircraft, while the receiver aircraft is only required to be fitted with minimal equipment, i.e. the line and drogue, communication unit, and control unit. This minimises costs for airlines, which may operate large fleets of receiver aircraft. The parts of the system which are fitted to the receiver aircraft do not carry any inherent fire risk, which will allay safety concerns for the airlines.

The fuelling system can be accounted for in the design of new receiver and tanker aircraft. Advantageously a receiver aircraft can be "retrofitted" with the relevant components of the fuelling system. It is envisaged that these components can be conveniently provided in a self-contained unit having standard dimensions of common unit load devices (ULDs), e.g. LD3, that will fit in the rear cargo bay of a receiver aircraft. Similarly an existing tanker aircraft may be retrofitted with the fuel hose and fuel probe.

Thus the invention enables safe and practicable inflight (re)fuelling of aircraft, including civil aircraft.

BRIEF DESCRIPTION OF THE DRAWINGS

Examples will now be described with reference to the accompanying FIGS. 1 to 9, which illustrate an inflight (re)fuelling operation.

DETAILED DISCUSSION

Figure 3:
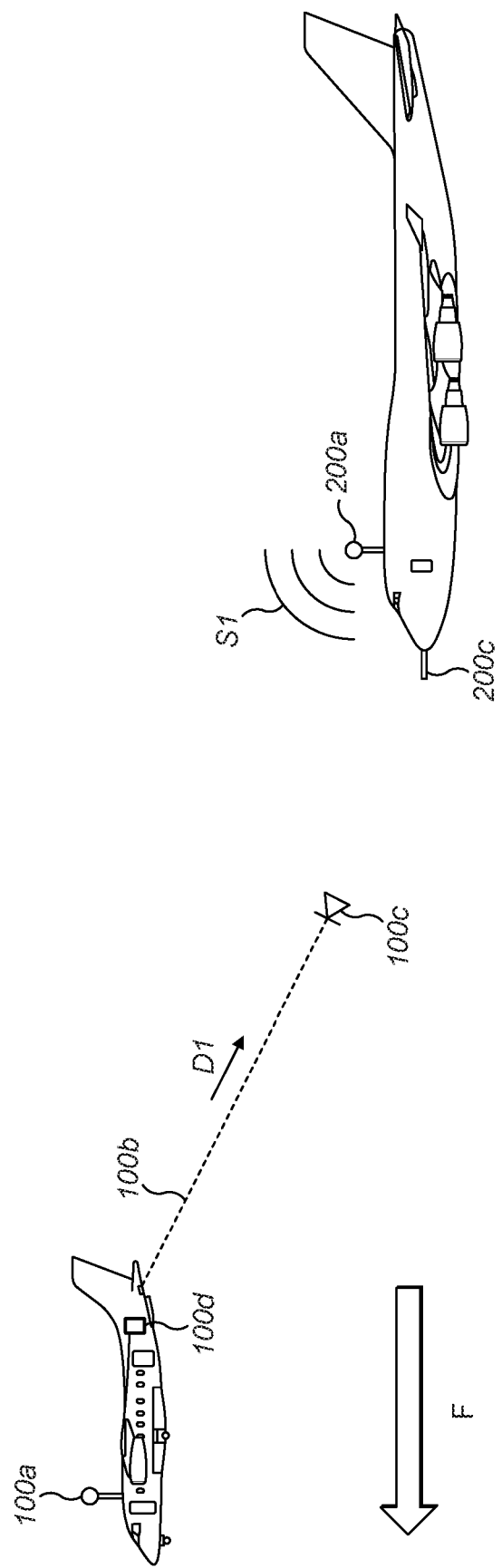

FIG. 1 shows a fuel receiver aircraft 100, which is a commercial airliner. The receiver aircraft 100 is flying straight and level in a forward direction F at a constant speed. In other words, the receiver aircraft 100 is being flown at a steady cruise.

The receiver aircraft 100 comprises a communication unit (e.g. including an antenna) 100a. The receiver aircraft 100 further comprises a cable drum unit (not shown in the Figures) which is located in the tail section of the aircraft 100. In this example the drum is a motorised, multi-speed, geared drum which is articulated such that it can be disposed in any orientation relative to the direction of travel of the receiver aircraft 100. The cable drum unit houses a cable 100b (not shown in FIG. 1) which is wound around the drum, one end of the cable 100b being fixedly attached to the drum. In this example the cable 100b is constructed from steel. Alternatively the cable 100b may be constructed from some other material having high tensile strength and flexibility, e.g. carbon fibre composite. The other end (or free end) of the cable 100b is fixedly attached to a drogue 100c (not shown in FIG. 1). In this example the structure of the drogue 100c is collapsible for convenient storage in the tail section of the receiver aircraft 100. The receiver aircraft 100 further comprises a control unit 100d which is configured to operably control the cable drum unit and thereby the cable 100b and the drogue 100c. The receiver aircraft 100 further comprises a fuel nozzle which is connected to fuel tanks of the receiver aircraft 100 via fuel lines (none of these elements being shown in in the Figures).

Still referring to FIG. 1, a fuel tanker aircraft 200, which is a converted commercial airliner, is located behind and below the fuel receiver aircraft 100. The tanker aircraft 200 is approaching the receiver aircraft 100 in a level climb.

The tanker aircraft 200 comprises a communication unit (e.g. including an antenna) 200a. The tanker aircraft 200 further comprises a hose drum unit (not shown in the Figures) which is located in the nose section of the aircraft 200. In this example the drum is a motorised, multi-speed, geared drum. The hose drum unit houses a fuel hose 200b (not shown in FIG. 1) which is wound around the drum, one end of the fuel hose 200b being fixedly attached to the drum. In this example the fuel hose 200b is constructed from rubber materials. The other end of the fuel hose 200b is fixedly attached to the rearward end of an elongate fuel probe 200c. The fuel probe 200c projects forwardly from the nose of the tanker aircraft 200 and is configured to be detachable therefrom. In this example the fuel probe 200c is constructed from titanium alloy. The tanker aircraft 200 further comprises a control unit 200d which is configured to operably control the hose drum unit and thereby the fuel hose 200b. The tanker aircraft 200 further comprises fuel storage tanks containing fuel, and a fuel pump for pumping the stored fuel through the fuel hose 200b (none of these elements being shown in the Figures).

Referring now to FIG. 2, the tanker aircraft 200 has taken up position behind and below the receiver aircraft 100. In this position the tanker aircraft 200 is flying straight and level in the forward direction F at a constant speed. The forward speed of the tanker aircraft 200 is being controlled to be substantially the same as the forward speed of the receiver aircraft 100. Furthermore the tanker aircraft 200 is being controlled to remain at a constant lateral- and height-separation from the receiver aircraft 100. That is, the tanker aircraft 200 is being controlled to remain in a fixed position relative to the receiver aircraft 100. Thus the tanker aircraft 200 and the receiver aircraft 100 are flying in formation with each other. With the flight formation established, an inflight (re)fuelling operation is carried out, as follows.

Turning to FIG. 3, a first command signal S1 is sent by the communication unit 200a of the tanker aircraft 200. The first command signal S1 is received by the communication unit 100a of the receiver aircraft 100 and is processed by the control unit 100d thereof. In response to the first command signal S1 the control unit 100d controls the cable drum unit to deploy the cable 100b and drogue 100c from the receiver aircraft 100. As can been seen from FIG. 3, the cable 100b and drogue 100c are deployed rearwardly of the receiver aircraft 100 in a first direction D1. In this example the cable 100b is unwound slowly from the drum in low gear initially, as the drogue 100c emerges from the receiver aircraft 100, then more quickly in high gear as the drogue 100c moves further away from the receiver aircraft 100. Low gear is then used again for fine control as the drogue 100c approaches the tanker aircraft 200. During deployment of the cable 100b and drogue 100c the receiver aircraft 100 and the tanker aircraft 200 remain in formation at constant speed in straight and level flight in the forward direction F.

Figure 4:
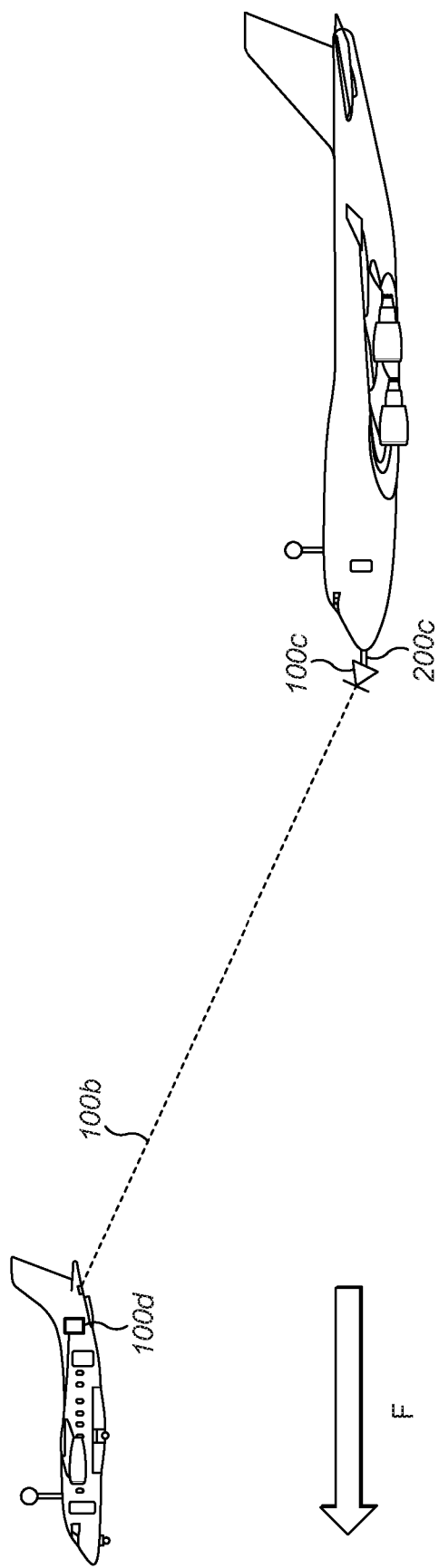

Referring next to FIG. 4, the cable 100b is extended sufficiently so that the drogue 100c is close to the nose of the tanker aircraft 200 and the fuel probe 200c which extends therefrom. The tanker aircraft 200 is flown (e.g. accelerated) toward the drogue 100c in order for the fuel probe 200c to engage the drogue 100c. Specifically the tanker aircraft 200 is manoeuvred so that the fuel probe 200c enters the rearward end of the funnel-shaped drogue 100c and is passed through a central aperture of the drogue 100c so as to project outwardly from the forward end of the drogue 100c. Once the drogue 100c is positioned over the fuel probe 200c in this way the drogue 100c is fixedly coupled to the fuel probe 200c. In this example the coupling is by means of self-actuating mechanical clamps, which are comprised by one or both of the drogue 100c and the fuel probe 200c and are activated to close by the forward passage of the fuel probe 200c through the drogue 100c.

In this coupled condition the tanker aircraft 200 is tethered to the receiver aircraft 100 by the cable 100b and drogue 100c. The tanker aircraft 200 is again controlled to remain in a fixed position (i.e. with regard to lateral- and height-separation) relative to the receiver aircraft 100, such that the two aircraft are flying in formation with each other. The control unit 100d is operable to control the drum of the cable drum unit in order to maintain tension in the cable 100b, so as to mitigate any turbulence which might cause the receiver aircraft 100 and the tanker aircraft 200 to move relative to each other momentarily.

Figure 5:
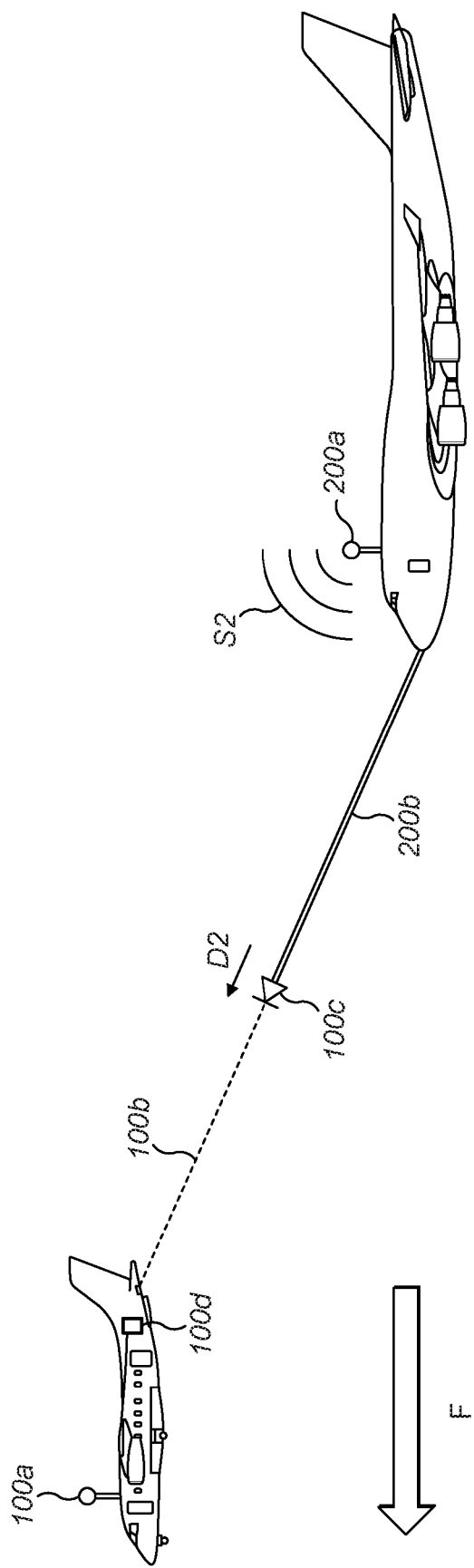

Referring now to FIG. 5, a second command signal S2 is sent by the communication unit 200a of the tanker aircraft 200. The second command signal S2 is received by the communication unit 100a of the receiver aircraft 100 and is processed by the control unit 100d thereof. In response to the second command signal S2 the control unit 100d controls (i.e. reverses) the cable drum unit to retract the cable 100b and drogue 100c back toward the receiver aircraft 100, in a second direction D2 which is opposite to the first direction D1.

The tensile (pulling) force on the cable 100b causes the fuel probe 200c (which is coupled to the drogue 100c) to detach from the nose of the tanker aircraft 200. The fuel hose 200b, which is attached to the rearward end of the fuel probe 200c, is thus drawn from the nose of the tanker aircraft 200. As the cable 100b is wound on the drum of the cable drum unit of the receiver aircraft 100, the fuel hose 200b is expelled from the hose drum unit of the tanker aircraft 200. In this example the control unit 200d of the tanker aircraft 200 controls the hose drum unit to assist in the deployment of the fuel hose 200b. Therefore in this example the fuel hose 200b is extended and the cable 100b is retracted by the simultaneous actions of the hose drum unit of the tanker aircraft 200 and the cable drum unit of the receiver aircraft 100. Alternatively the hose drum unit may be allowed to "freewheel" so that the fuel hose 200b is extended by just the action of the cable drum unit.

Thus the cable 100b, drogue 100c, fuel probe 200c and fuel hose 200b are drawn toward the receiver aircraft 100. During this operation the receiver aircraft 100 and the tanker aircraft 200 remain in formation.

Figure 6:
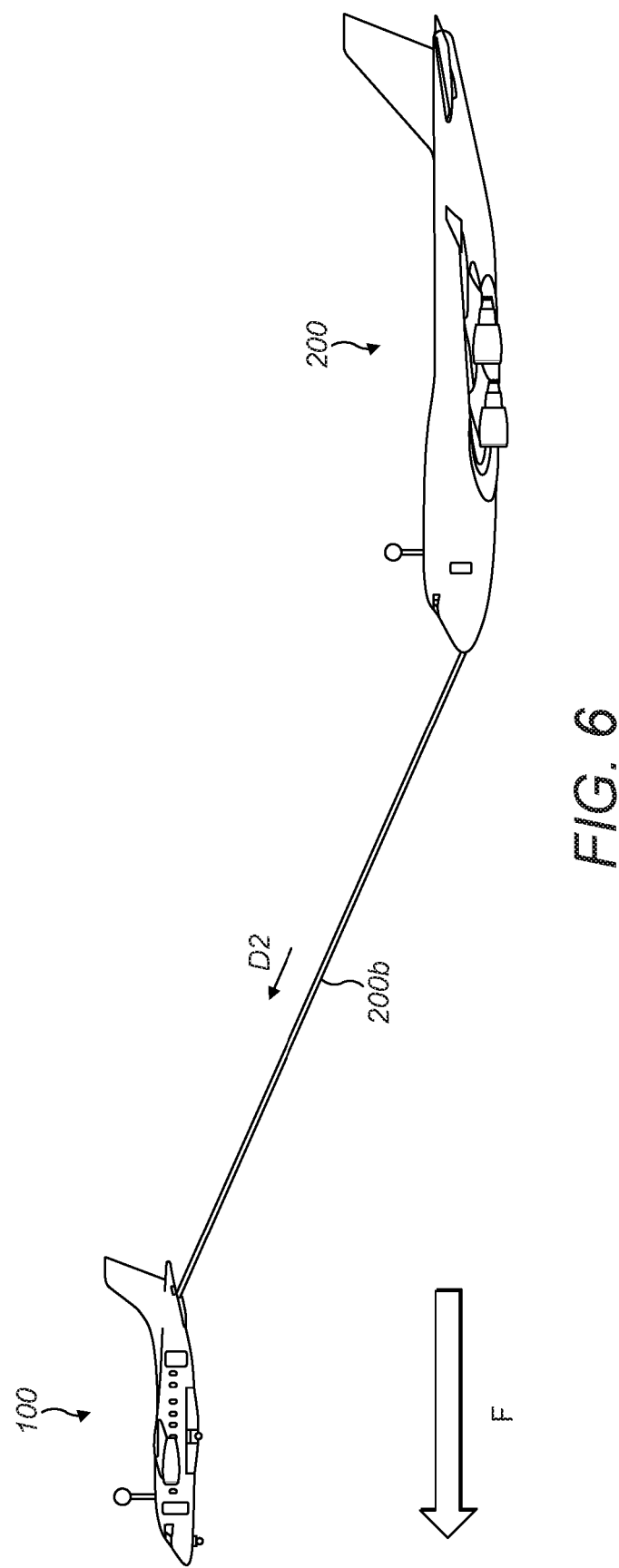

When the drogue 100c and fuel probe 200c reach the receiver aircraft 100 the low gear of the cable drum unit is applied and the fuel probe 200c is guided to the fuel nozzle of the receiver aircraft 100. The fuel nozzle receives the forward end of the fuel probe 200c, which projects forwardly of the drogue 100c as described above. In this condition the fuel hose 200b is extended the full distance between the tanker aircraft 200 and the receiver aircraft 100, as shown in FIG. 6. The two aircraft 100, 200 remain in formation. A tensile (pulling) force, exerted on the cable 100b (and thereby on the drogue 100c) by the cable drum unit, holds the forward end of the fuel probe 200c securely in the nozzle to facilitate fuel transfer with no leakage. If very high pressure fuel transfer is required then a latch mechanism may be provided to positively lock the fuel probe 200c to the fuel nozzle.

The fuel pump of the tanker aircraft 200 is activated, to transfer fuel from the fuel storage tanks of the tanker aircraft 200 to the fuel tanks of the receiver aircraft 100 (i.e. in direction D2). The fuel transfer is controlled by the crew of the tanker aircraft 200.

Optionally the receiver aircraft 100 includes one or more fuel pumps and/or valves for directing the fuel to the different fuel tanks of the receiver aircraft 100. In this way the trim and balance of the receiver aircraft 100 can be controlled. One or more of the fuel pumps of the receiver aircraft 100 may draw fuel from the tanker aircraft 200 via the fuel hose 200b. The fuel pumps and/or valves of the receiver aircraft 100 may be controlled by the crew of the tanker aircraft 200, for example via signals which are sent by the communication unit 200a of the tanker aircraft 200 to the communication unit 100a of the receiver aircraft 100 and processed by the control unit 100d of the receiver aircraft 100.

The amount of fuel being transferred to the receiver aircraft 100 is monitored (and optionally recorded) by the crew of the tanker aircraft 200. The crew of the receiver aircraft 100 may advise the crew of the tanker aircraft 200 of the total amount of fuel required, for example by radio communication. Alternatively the crew of the tanker aircraft 200 may be advised by a third party, for example an operator at a base of the airline which owns the receiver aircraft 100, of the total amount of fuel to be transferred. The total amount of fuel to be transferred may be predetermined. The amount of fuel transferred may be recorded using fuel flow devices on the receiver aircraft 100, which may be remotely interrogated at a later time.

When the required amount of fuel has been transferred the fuel pump of the tanker aircraft 200 is deactivated (along with the fuel pump of the receiver aircraft 100, if being used) so that fuel flow through the fuel hose 200b ceases. The fuel hose 200b may be vented, to displace any residual fuel from the fuel hose 200b to the fuel tanks of the receiver aircraft 100.

Figure 7:
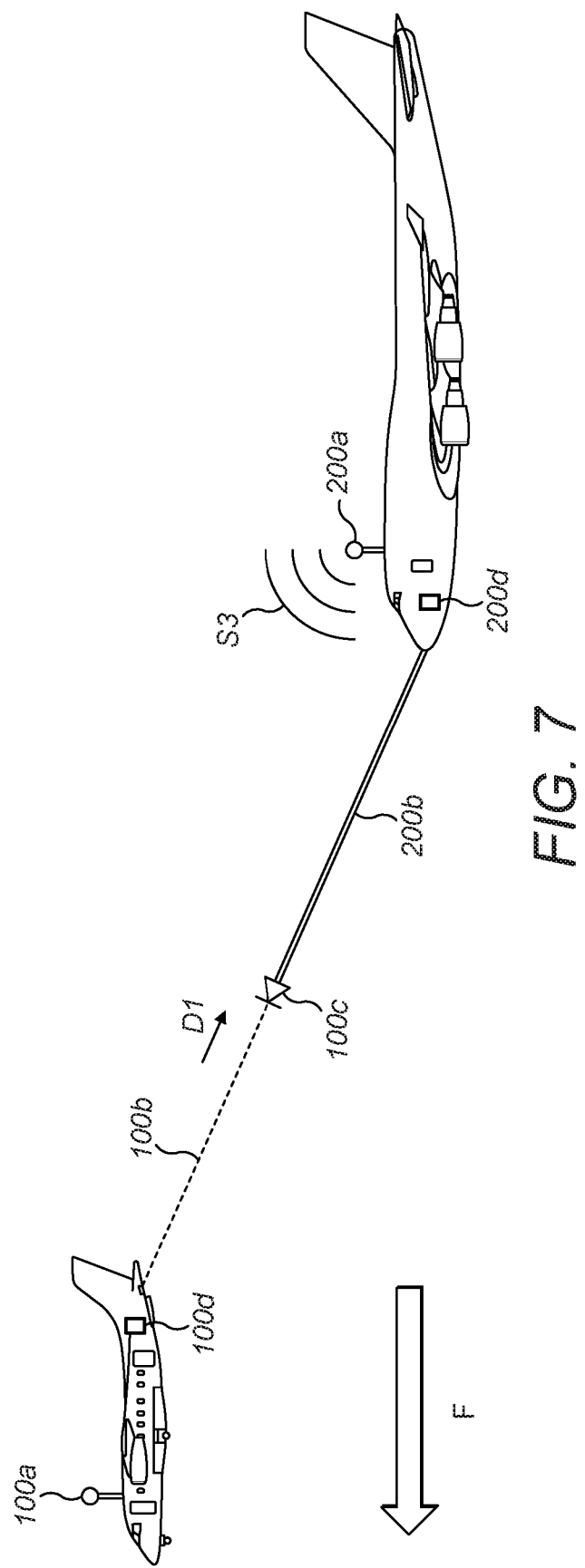

Referring next to FIG. 7, a third command signal S3 is sent by the communication unit 200a of the tanker aircraft 200. The third command signal S3 is received by the communication unit 100a of the receiver aircraft 100 and is processed by the control unit 100d thereof. In response to the third command signal S3 the control unit 100d controls the cable drum unit to deploy the cable 100b and drogue 100c, and thereby the fuel probe 200c which is still coupled to the drogue 100c. Furthermore the control unit 200d of the tanker aircraft 200 controls the hose drum unit to retract the fuel hose 200b. Therefore the cable 100b is extended and the fuel hose is 200b is retracted by the simultaneous actions of the cable drum unit of the receiver aircraft 100 and the hose drum unit of the tanker aircraft 200. Thus the cable 100b and drogue 100c, fuel probe 200c and fuel hose 200b are moved in the first direction D1 toward the tanker aircraft 200. Alternatively the cable drum unit may be allowed to "freewheel" so that the cable 100b is extended by just the action of the hose drum unit. During this operation the receiver aircraft 100 and the tanker aircraft 200 remain in formation.

Figure 8:
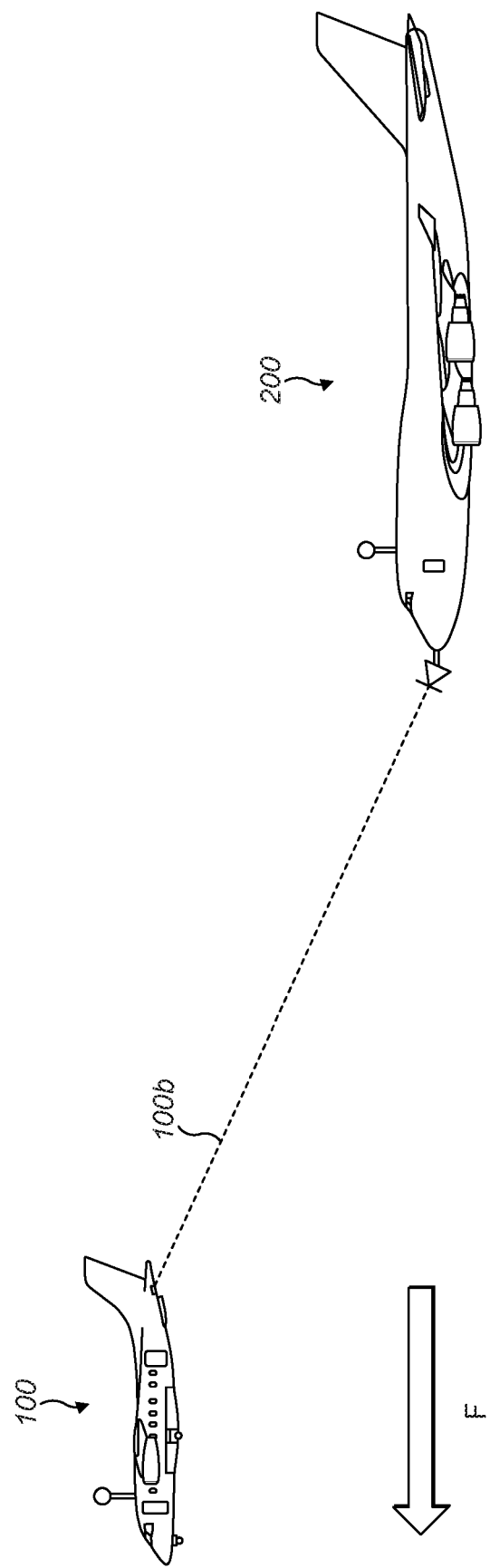

When the drogue 100c and fuel probe 200c reach the tanker aircraft 200 the fuel probe 200c is drawn (by the hose drum unit) back into the nose of the tanker aircraft 200 so as to be reattached thereto. As the fuel probe 200c is drawn into the nose of the tanker aircraft 200 the self-actuating mechanical clamps are released to decouple the drogue 100c from the fuel probe 200c. In this condition the cable 100b is extended the full distance between the receiver aircraft 100 and the tanker aircraft 200, as shown in FIG. 8. The two aircraft 100, 200 remain in formation.

Figure 9:
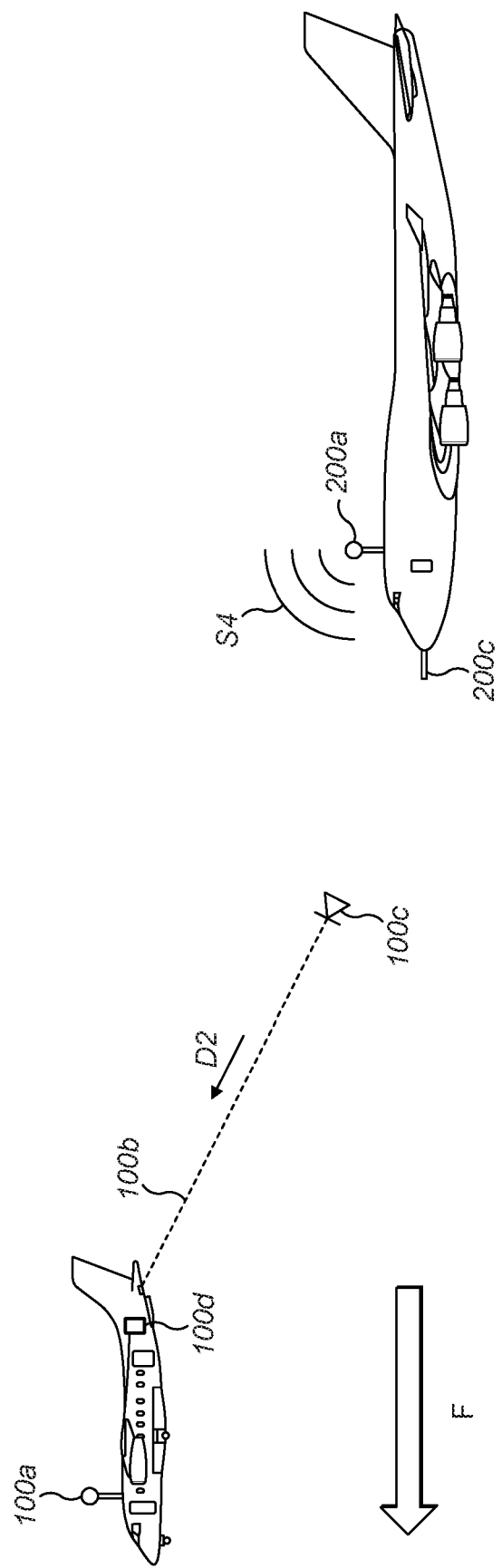

Referring now to FIG. 9, a fourth command signal S4 is sent by the communication unit 200a of the tanker aircraft 200. The fourth command signal S4 is received by the communication unit 100a of the receiver aircraft 100 and is processed by the control unit 100d thereof. In response to the fourth command signal S4 the control unit 100d controls (i.e. reverses) the cable drum unit to retract the cable 100b and drogue 100c back toward the receiver aircraft 100 in the second direction D2. The cable 100b is wound on the drum in low gear initially. The tensile (pulling) force on the cable 100b causes the drogue 100c to pass forwardly along the fixed fuel probe 200c so as to separate from the fuel probe 200c. In this separated condition the tanker aircraft 200 is untethered from the receiver aircraft 100 and is free to break formation. The cable 100b is wound on the drum in high gear to draw the drogue 100c toward the receiver aircraft 100. Low gear is then used again for fine control as the drogue 100c approaches the receiver aircraft 100. The cable 100b is fully retracted so that the cable 100b is stored by the cable drum unit and the drogue 100c is stored in the tail section of the receiver aircraft 100. During retraction of the cable 100b and drogue 100c the receiver aircraft 100 preferably remains at constant speed in straight and level flight in the forward direction F.

In the above-described example the receiver aircraft 100 and the tanker aircraft 200 are flown manually by their respective pilots. Alternatively, the speed and direction of one or both of the receiver aircraft 100 and the tanker aircraft 200 may be controlled automatically, for example by autopilot, or remotely from a control station in the case of an unmanned aircraft. The formation speed and direction (ground track) of the receiver aircraft 100 and the tanker aircraft 200 may be predetermined by the crew of the tanker aircraft 200, such as to be optimal for inflight fuelling operations.

Also in the above-described example the tanker aircraft 200 is manoeuvred (flown) toward the drogue 100c in order for the fuel probe 200c to engage the drogue 100c. Alternatively (or additionally) the drogue 100c may be configured to be controllable by the tanker aircraft 200 in flight to engage the fuel probe 200c. In such an example the drogue 100c comprises aerodynamic control surfaces which are adjustable in order to controllably alter the position and/or orientation of the drogue 100c in flight, thereby to guide the drogue 100c to engage with the fuel probe 200c.

For example the drogue 100c may comprise a plurality of stabilising fins and the control surfaces may comprise deflectable trailing edges of the fins. The cable 100b may comprise a conductive material so that electrical power may be provided to the control surfaces by the receiver aircraft 100 via the cable 100b. Alternatively the drogue 100c may comprise an air-driven generator or other dedicated power source for providing electrical power to the control surfaces.

The drogue 100c may comprise a communication unit for receiving control signals for the control surfaces directly from the communication unit 200a of the tanker aircraft 200. Alternatively control signals, for adjusting the control surfaces, may be sent from the communication unit 200a of the tanker aircraft 200 to the communication unit 100a of the receiver aircraft 100, processed by the control unit 100d of the receiver aircraft 100, and sent to the control surfaces of the drogue 100c via the cable 100b.

The fins may comprise rounded leading edges comprising a shock-resistant material to minimise risk of damage to the receiver aircraft 100 or the tanker aircraft 200 during deployment.

The drogue 100c may comprise radar transponders, and the tanker aircraft 200 may comprise a close-range radar system, for assisting low-visibility acquisition and engagement of the drogue 100c by the fuel probe 200c of the tanker aircraft 200. The drogue 100c may comprise differently coloured lights to aid visual manoeuvring of the drogue 100c in low-visibility conditions.

In another example the fuel probe 200c (or the free end of the fuel hose 200b) is configured to be steerable, by the crew of the tanker aircraft 200, to engage with the drogue.

In the event of a catastrophic rupture of the fuel hose 200b during fuelling, a fuel hose 200b jettison sequence may be initiated, by either the crew of the receiver aircraft 100 or the crew of the tanker aircraft 200, which will minimise the risk of collision between the fuel hose 200b and the tanker aircraft 200. Jettisoning should preferably commence at the receiver aircraft 100 end, either by releasing the fuel probe 200c from the drogue 100c or by guillotining the fuel hose 200b. A chute may be rapidly deployed (for example using an explosive charge, similar to that used in vehicle airbags) which at high speed will drag the distal end of the fuel hose 200b away from the receiver aircraft 100. Immediately after this sequence, a similar chute may be deployed at the other end of the fuel hose 200b proximate to the tanker aircraft 200. At the tanker aircraft 200 end the fuel hose 200b is directed by the chute to be jettisoned upwards, such that the deployed chute drags the fuel hose 200b away from the tanker aircraft 200 and particularly its wings, engines and tail. The fuel hose 200b may include a transponder which can be activated to allow recovery. This is useful since refuelling operations will normally be carried out over water or sparsely populated areas. The fuel hose 200b may include a flotation device to aid recovery from water.

Other safety features may be provided, as follows. A fire suppression system may be integrated into one or both of the receiver aircraft 100 and the tanker aircraft 200. Fuel flow valves may be provided in the fuel hose 200b and linked to pressure sensors, such that a sudden loss of pressure will automatically cause the valves and fuel pump(s) to shut down. An inerting system may be provided to supply an inert gas, to vent the fuel hose 200b on completion of fuel transfer and to vent the fuel lines in the receiver aircraft 100. The fuel hose 200b may comprise lightning-diffusion means, for example a conductive mesh disposed at or under the surface of the fuel hose, for dissipating a lightning strike.

It will be understood that the invention has been described in relation to preferred examples and may be modified in many different ways without departing from the scope of the invention as defined by the accompanying claims.

In an example the fuel probe 200c is located on the tanker aircraft 200 at a position other than the nose, for example above the cockpit or at a forward position on a side of the fuselage. In such an example the hose drum unit is appropriately located in the tanker aircraft 200 in the vicinity of the fuel probe 200c.

In an example the fuel probe 200c of the tanker aircraft 200 is omitted. In this case the free end of the fuel hose 200b projects from the nose of the tanker aircraft 200, and is engaged by the drogue 100c and by the fuel nozzle of the receiver aircraft 100.

With regard to all the examples of the invention, the command signals, which are sent by the communication unit 200a of the tanker aircraft 200 to the communication unit 100a of the receiver aircraft 100, may be transmitted and processed sequentially. Alternatively two or more (optionally all) of the signals may be transmitted simultaneously and processed sequentially. The control unit 100d of the receiver aircraft 100 may be pre-programmed to perform the sequential processing upon receipt of the simultaneously-transmitted signals.

Various kinds of line other than a cable are envisaged for use with the drogue, for example wire, cord, rope, chain, or the like, and all of these are within the scope of the claimed invention.

The invention provides benefits to several parties, but primarily aircraft manufacturers and commercial aircraft operators, e.g. airlines, as follows.

Studies have demonstrated the fuel savings of in-flight refuelling (IFR) of commercial aircraft to be in the order of 11-23%, net of fuelling the delivery of the fuel via the tanker aircraft. Since fuel is a very significant operating cost (IATA estimates the global airline industry's fuel bill in 2018 to be $188 billion), the opportunity to make savings of this magnitude are revolutionary (normally a 2% fuel saving through engine efficiency is seen as a major improvement). These fuel savings would have a material impact on the profitability of an airline and, in the longer term, the whole industry.

Providing IFR capability to existing aircraft would also have the following benefits:

Reduced take-off weight, leading to ability to use shorter runways which would open up access to new destination airports that currently do not have the length of runway required.

Reduced thrust required on take-off due to reduced weight, so delivering environmental benefits in $CO_2$ footprint, reduced noise and pollution.

Reduced landing charges, with less frequent refuelling stops and reduced environmental impact.

Fewer landings and take-offs could be expected to lengthen the operational life of landing gear, tyres and aircraft structure, offering better asset utilisation over time.

Capacity constraints at airports could be alleviated because although the overall capacity of the aviation industry would grow, the utilisation of airports would be proportionately lower.

With extended range of aircraft fleet fitted with IFR capability, a wider range of destinations and therefore better capacity utilisation and market opportunity will exist. Sustainable competitive advantage can be established for airlines with IFR capability versus those without. Revenue enhancement can be achieved with premium customers prepared to pay for shorter flight time to popular business destinations, none of which would be out of range with IFR, although dependent on other limiting factors (e.g. staff, consumables, passenger comfort, etc). Part of the time and fuel savings would come from direct flight paths, not requiring diversion from optimal path for landing and refuelling as well as the actual time and cost of landing, refuelling on the ground and take off.

In the longer term, the design of aircraft may be adapted, with the trade-off of smaller fuel tanks and fuel storage and weight required, against more fee-paying passengers, more cargo, or other added-value services that can optimise the revenue yield for the airline.

Tanker services may be provided in different high density flight locations, optimising the location relative to the profile of flights passing nearby. Tankers would provide scheduled fuel transfer services in defined air corridor service areas ("Garages/Gas Stations in the Sky" or "Fuel Ferries"), served from nearby airfields that might specialise in tanker operations only. The possibility of tankers providing fuel to commercial receivers from astern, and to military receivers from a forward position, offers the opportunity of dual-function tankers, able to service both commercial aircraft (as described herein) and military aircraft (by established probe and drogue or flying boom methods).

The opportunity to "retrofit" IFR to existing fleets (circa 20,000 operating aircraft in the non-military sectors) offers an additional revenue opportunity from the IFR equipment, installation and after-sales services. Because the IFR equipment can be retrofitted via a standard size cargo ULD unit, which fits into a wide range of aircraft manufacturers' aircraft, the opportunity exists for one manufacturer to capture this market across competitors' aircraft as well as their own. A revenue opportunity exists to share in the material savings that airlines would achieve.

In the longer term aircraft designs can be changed to take account of the need to carry less fuel, even for long-haul flights. This will give greater flexibility to introduce capacity for more fee paying passengers or value-added services that can increase revenue opportunity and therefore revenue yield. Aircraft designs using this IFR technology would have materially greater fuel efficiency and therefore sustainable competitive advantage would accrue to adopters. It would also provide greater protection against adoption of alternative power systems and the investments required to operationalise them. Environmental benefits would be competitive advantages in an increasingly environmentally sensitive marketplace.

New tanker designs or adaptations of existing tanker fleets could provide both services via this novel IFR technology to commercial aircraft, both passenger and cargo, but also via existing drogue and probe and flying boom methods, to military aircraft. This would offer competitive advantage to the aircraft manufacturer though the ability of customers to defray costs across both segments and leasing of aircraft with dual function, optimising asset utilisation and materially reducing costs of the capability for both users.

While the invention has been described generally in the context of civil or commercial aircraft operations, it will be understood that the invention is applicable to aircraft of various types in both civil and military contexts. For example, the invention may be used in connection with fixed-wing and rotary wing aircraft (e.g. helicopters) and manned and unmanned aircraft (e.g. drones).

Also, while the invention is envisaged for use most typically with liquid fuels, for example kerosene (normally used to power large commercial aircraft), it is applicable also to other fuel types, for example gases or propellants, or electric power transfer.

The invention claimed is:

1. A method of operating a fuel tanker aircraft for in-flight fuelling, comprising:
    transmitting a deploy command signal from a communication unit of the tanker aircraft to a communication unit of a fuel receiver aircraft, to cause a line and drogue to deploy from the receiver aircraft;
    controlling at least one of the tanker aircraft or the drogue to engage the drogue with a first end of a fuel hose of the tanker aircraft, a second end of the fuel hose being connected to the tanker aircraft;
    transmitting a return command signal from the communication unit of the tanker aircraft to the communication unit of the receiver aircraft, to cause the line and drogue to return to the receiver aircraft with the first end of the fuel hose, the returning of the line and drogue to the receiver aircraft causing the fuel hose to be deployed from the tanker aircraft,
    controlling, by a control unit of the tanker aircraft, a hose drum unit of the tanker aircraft and a line drum unit of the receiver aircraft such that the line and drogue are returned and the fuel hose is deployed by simultaneous actions of the hose drum unit and the line drum unit;
    transmitting a first further return command signal from the communication unit of the tanker aircraft to the communication unit of the fuel receiver aircraft, to cause the line and drogue and the first end of the fuel hose to return to the tanker aircraft;
    causing the drogue to disengage from the first end of the fuel hose; and
    transmitting a second further return command signal from the communication unit of the tanker aircraft to the communication unit of the receiver aircraft, to cause the line and drogue to return to the receiver aircraft,
    wherein the tanker aircraft is located behind the receiver aircraft and the deploy command signal is for causing the line and drogue to deploy rearwardly of the receiver aircraft.

2. A method of operating a fuel tanker aircraft according to claim 1, further comprising activating a fuel pump of the tanker aircraft to transfer fuel from the tanker aircraft to the receiver aircraft via the fuel hose.

3. A method of operating a fuel tanker aircraft according to claim 1, wherein controlling the tanker aircraft to engage the drogue with the first end of the fuel hose comprises manoeuvring the tanker aircraft to guide the first end of the fuel hose into the drogue.

4. A method of operating a fuel tanker aircraft according to claim 1, wherein controlling the drogue to engage the drogue with the first end of the fuel hose comprises sending control signals from the communication unit of the tanker aircraft to cause adjustment of aerodynamic control surfaces of the drogue to guide the drogue onto the first end of the fuel hose.

5. A method of operating a fuel receiver aircraft for in-flight fuelling, comprising:
    acquiring, in a communication unit of the receiver aircraft, a deploy command signal from a communication unit of a fuel tanker aircraft;
    in response to the deploy command signal, controlling a line and drogue to deploy from the receiver aircraft to enable the drogue to be engaged with a first end of a fuel hose of the tanker aircraft, a second end of the fuel hose being connected to the tanker aircraft;
    acquiring, in the communication unit of the receiver aircraft, a return command signal from the communication unit of the tanker aircraft;
    in response to the return command signal, controlling the line and drogue to return to the receiver aircraft with the first end of the fuel hose, the returning of the line and drogue to the receiver aircraft causing the fuel hose to be deployed from the tanker aircraft, such that the line and drogue are returned and the fuel hose is deployed by simultaneous actions of a hose drum unit on the tanker aircraft and a line drum unit on the receiver aircraft;
    acquiring, in the communication unit of the receiver aircraft, a first further return command signal from the communication unit of the tanker aircraft;
    in response to the first further return command signal, controlling the line and drogue to return to the tanker aircraft with the first end of the fuel hose;
    acquiring, in the communication unit of the receiver aircraft, a second further return command signal from the communication unit of the tanker aircraft; and
    in response to the second further return command signal, controlling the line and drogue to return to the receiver aircraft,
    wherein the tanker aircraft is located behind the receiver aircraft and the line and drogue are controlled to deploy rearwardly of the receiver aircraft.

6. A method of operating aircraft for in-flight fuelling, comprising:
    transmitting a deploy command signal from a communication unit of a fuel tanker aircraft;
    acquiring the deploy command signal in a communication unit of a fuel receiver aircraft;
    in response to the deploy command signal, controlling a line and drogue to deploy from the receiver aircraft;

controlling at least one of the tanker aircraft or the drogue to engage the drogue with a first end of a fuel hose of the tanker aircraft, a second end of the fuel hose being connected to the tanker aircraft;
transmitting a return command signal from the communication unit of the tanker aircraft;
acquiring the return command signal in the communication unit of the receiver aircraft;
in response to the return command signal, controlling the line and drogue to return to the receiver aircraft with the first end of the fuel hose, the returning of the line and drogue to the receiver aircraft causing the fuel hose to be deployed from the tanker aircraft;
controlling, by a control unit of the tanker aircraft, a hose drum unit of the tanker aircraft and a line drum unit of the receiver aircraft such that the line and drogue are returned and the fuel hose is deployed by simultaneous actions of the hose drum unit and the line drum unit;
transmitting a first further return command signal from the communication unit of the tanker aircraft;
acquiring the first further return command signal in the communication unit of the receiver aircraft;
in response to the first further return command signal, controlling the line and drogue to return to the tanker aircraft with the first end of the fuel hose;
causing the drogue to disengage from the first end of the fuel hose;
transmitting a second further return command signal from the communication unit of the tanker aircraft;
acquiring the second further return command signal in the communication unit of the receiver aircraft; and
in response to the second further return command signal, controlling the line and drogue to return to the receiver aircraft,
wherein the tanker aircraft is located behind the receiver aircraft and the line and drogue are controlled to deploy rearwardly of the receiver aircraft.

7. A system for a fuel tanker aircraft for in-flight fuelling, comprising:
a fuel hose comprising a first end for engagement with a drogue of a fuel receiver aircraft and a second end connected to the fuel tanker aircraft;
a communication unit configured to transmit command signals to a communication unit of the receiver aircraft;
a hose drum unit; and
a control unit of the tanker aircraft for controlling the hose drum unit of the tanker aircraft and a line drum unit of the receiver aircraft such that the line and drogue are returned and the fuel hose is deployed by simultaneous actions of the hose drum unit and the line drum unit;
wherein the command signals comprise:
a deploy command signal, for causing the receiver aircraft to deploy a line and drogue rearwardly to the tanker aircraft behind the receiver aircraft to enable the drogue to be engaged with the first end of the fuel hose;
a return command signal, for causing the line and drogue to return to the receiver aircraft with the first end of the fuel hose, the returning of the line and drogue to the receiver aircraft causing the fuel hose to be deployed from the tanker aircraft;
a first further return command signal, for causing the line and drogue and the first end of the fuel hose to return to the tanker aircraft; and
a second further return command signal, for causing the line and drogue to return to the receiver aircraft.

8. A system for a fuel tanker aircraft according to claim 7, wherein the first end of the fuel hose comprises a fuel probe configured to be removably attached to the fuel tanker aircraft.

9. A system for a fuel receiver aircraft for in-flight fuelling, comprising:
a line and drogue for engagement with a first end of a fuel hose of a fuel tanker aircraft, a second end of the fuel hose being connected to the tanker aircraft;
a communication unit configured to acquire deploy and return command signals from a communication unit of the tanker aircraft;
a line drum unit; and
a controller configured to:
in response to the deploy command signal, deploy the line and drogue rearwardly to the tanker aircraft behind the receiver aircraft to enable the drogue to be engaged with the first end of the fuel hose;
in response to the return command signal, return the line and drogue to the receiver aircraft with the first end of the fuel hose, the returning of the line and drogue to the receiver aircraft causing the fuel hose to be deployed from the tanker aircraft, such that the line and drogue are returned and the fuel hose is deployed by simultaneous actions of a hose drum unit on the tanker aircraft and the line drum unit;
in response to a first further return command signal from the communication unit of the tanker aircraft, deploy the line and drogue and the first end of the fuel hose from the receiver aircraft to the tanker aircraft, and
in response to a second further return command signal from the communication unit of the tanker aircraft, return the line and drogue to the receiver aircraft.

10. A system for a fuel receiver aircraft according to claim 9, wherein the drogue comprises adjustable aerodynamic control surfaces for guiding the drogue for engagement with the first end of the fuel hose in flight.

11. A system for a fuel receiver aircraft according to claim 10, wherein the drogue further comprises a communication unit for receiving control signals from the communication unit of the tanker aircraft for adjusting the aerodynamic control surfaces.

12. A system for a fuel receiver aircraft according to claim 10, wherein the drogue further comprises a dedicated electrical power source for powering the adjustable aerodynamic control surfaces.

13. A system for a fuel receiver aircraft according to claim 10, wherein the line comprises a conductive material for transmitting electrical power from the receiver aircraft to the drogue for powering the adjustable aerodynamic control surfaces.

14. A system for in-flight fuelling, comprising:
a fuel receiver aircraft comprising:
a line and drogue;
a communication unit configured to acquire deploy and return command signals for the line and drogue;
a controller for controlling the line and drogue in response to the command signals; and
a line drum unit on the receiver aircraft; and
a fuel tanker aircraft comprising:
a fuel hose comprising a first end for engagement with the drogue and a second end connected to the fuel tanker aircraft;
a hose drum unit on the tanker aircraft;
a control unit for controlling the hose drum unit of the tanker aircraft and a line drum unit of the receiver aircraft such that the line and drogue are returned and the fuel hose is deployed by simultaneous actions of the hose drum unit and the line drum unit; and a communication unit configured to transmit the command signals, wherein:

the controller is configured, in response to the deploy command signal, to deploy the line and drogue rearwardly to the tanker aircraft behind the receiver aircraft;

at least one of the tanker aircraft and the drogue is controllable to engage the drogue with the first end of the fuel hose;

the controller is configured, in response to the return command signal, to return the line and drogue to the receiver aircraft with the first end of the fuel hose, the returning of the line and drogue to the receiver aircraft causing the fuel hose to be deployed from the tanker aircraft;

the controller is configured, in response to a first further return command signal, to deploy the line and drogue from the receiver aircraft to the tanker aircraft with the first end of the fuel hose; and the controller is configured, in response to a second further return command signal, to return the line and drogue to the receiver aircraft.

15. A system for in-flight fuelling according to claim 14, wherein the drogue comprises adjustable aerodynamic control surfaces for guiding the drogue for engagement with the first end of the fuel hose in flight.

16. A system for in-flight fuelling according to claim 15, wherein the drogue further comprises a communication unit for receiving control signals from the communication unit of the tanker aircraft for adjusting the aerodynamic control surfaces.

17. A system for in-flight fuelling according to claim 15, wherein the drogue further comprises a dedicated electrical power source for powering the adjustable aerodynamic control surfaces.

18. A system for in-flight fuelling according to claim 15, wherein the line comprises a conductive material for transmitting electrical power from the receiver aircraft to the drogue for powering the adjustable aerodynamic control surfaces.

19. A method of operating a fuel tanker aircraft according to claim 1, further comprising:

controlling, by the control unit, the hose drum unit and the cable drum unit such that the line and drogue and first end of the fuel hose are returned to the tanker aircraft by simultaneous actions of the hose drum unit and the cable drum unit.

* * * * *